Nov. 9, 1965  C. L. ALLEN  3,216,777
APPARATUS FOR PERIODIC PHOTOGRAPHY
Filed July 5, 1962  2 Sheets-Sheet 1

Inventor.
Charles L. Allen.
By Zabel, Baker, York, Jones & Githman
Attorneys.

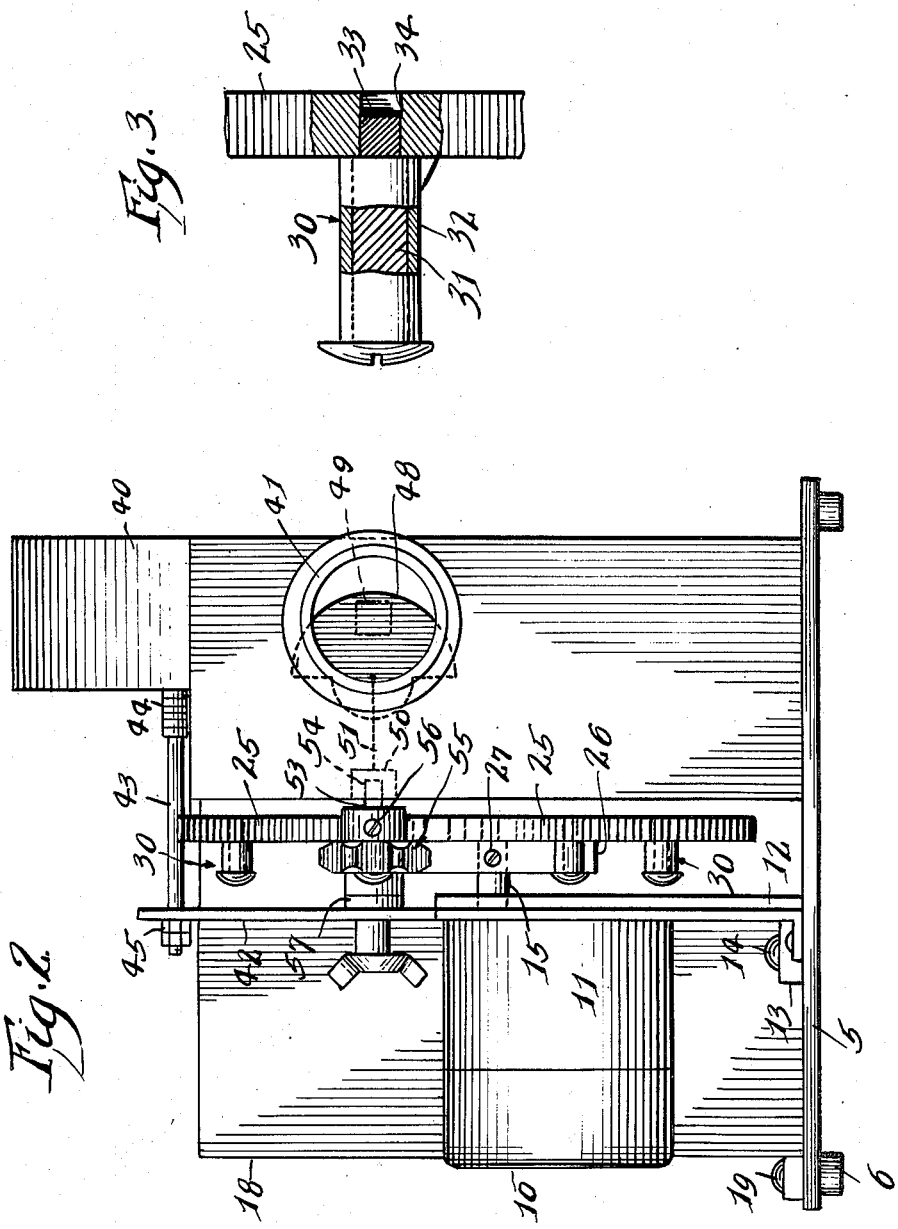

United States Patent Office 3,216,777
Patented Nov. 9, 1965

3,216,777
APPARATUS FOR PERIODIC PHOTOGRAPHY
Charles L. Allen, 1014 Osage Drive, Stillwater, Okla.
Filed July 5, 1962, Ser. No. 207,656
3 Claims. (Cl. 352—84)

This invention relates to photographic research apparatus, and more particularly to apparatus adapted to make pictorial recordings of human, animal, climatic and mechanical activity at preselected moments in time and under a wide variety of light conditions.

Apparatus constructed in accordance with the invention is a valuable tool in numerous fields of research, for example, the field of human behavior. The data which can be provided by the apparatus is of great value to psychologists, sociologists, political scientists, natural scientists, market researchers, surveyors of radio and television audiences and persons concerned with education and health.

In the field of animal behavior, information provided by this apparatus is useful to livestock manager, veterinarians, and agriculturists, all of whom are interested in various aspects of animal nutrition, feeding habits, belligerency, illness, births and various other animal characteristics.

In the field of mechanics, the apparatus will provide information pertaining to malfunction, breakage and fatigue. The pictorial records made by the apparatus will enable technicians, designers, manufacturers and users of mechanical devices to ascertain causes of failure and improve the quality of such devices.

One object of the invention is to provide photographic research apparatus, including parts of a motion picture-type camera, which is operable under a wide variety of conditions. The apparatus can be set to take a succession of "still" pictures automatically at preselected frequencies and during predetermined time periods throughout an extended time period. Further, the apparatus is easily adjusted to take pictures over a wide range of ambient light levels.

Another object is to provide photographic research apparatus which operates with virtual silence. This feature, of course, is particularly important when the subjects of interest are human or animal.

Still another object is to provide photographic research apparatus adapted to operate without attention over an extended period of time, for example, a week or more. The time period, of course, is a function of film capacity and picture-taking frequency.

Another object is to provide photographic research apparatus which is small in size, economical in cost and capable of yielding information beyond the scope of information obtainable from any prior photographic apparatus.

Another and more detailed object of the invention is to provide photographic research apparatus employing a novel an effective drive mechanism whereby the apparatus operates silently and with precision. The drive mechanism of the invention cooperates to control both the frequency and speed of the shutter used in the camera.

Other objects, advantages and details of the invention will be apparent as the description proceeds, reference being had to the accompanying drawings wherein one form of the invention is shown. It is to be understood that the description and drawings are illustrative only and that the scope of the invention is to be measured by the appended claims.

In the drawings:

FIG. 2 is a front elevational view of the apparatus shown in FIG. 1.

FIG. 3 is an enlarged fragmentary view, partly in section, of a portion of the drive mechanism used in the invention.

Figure 1:
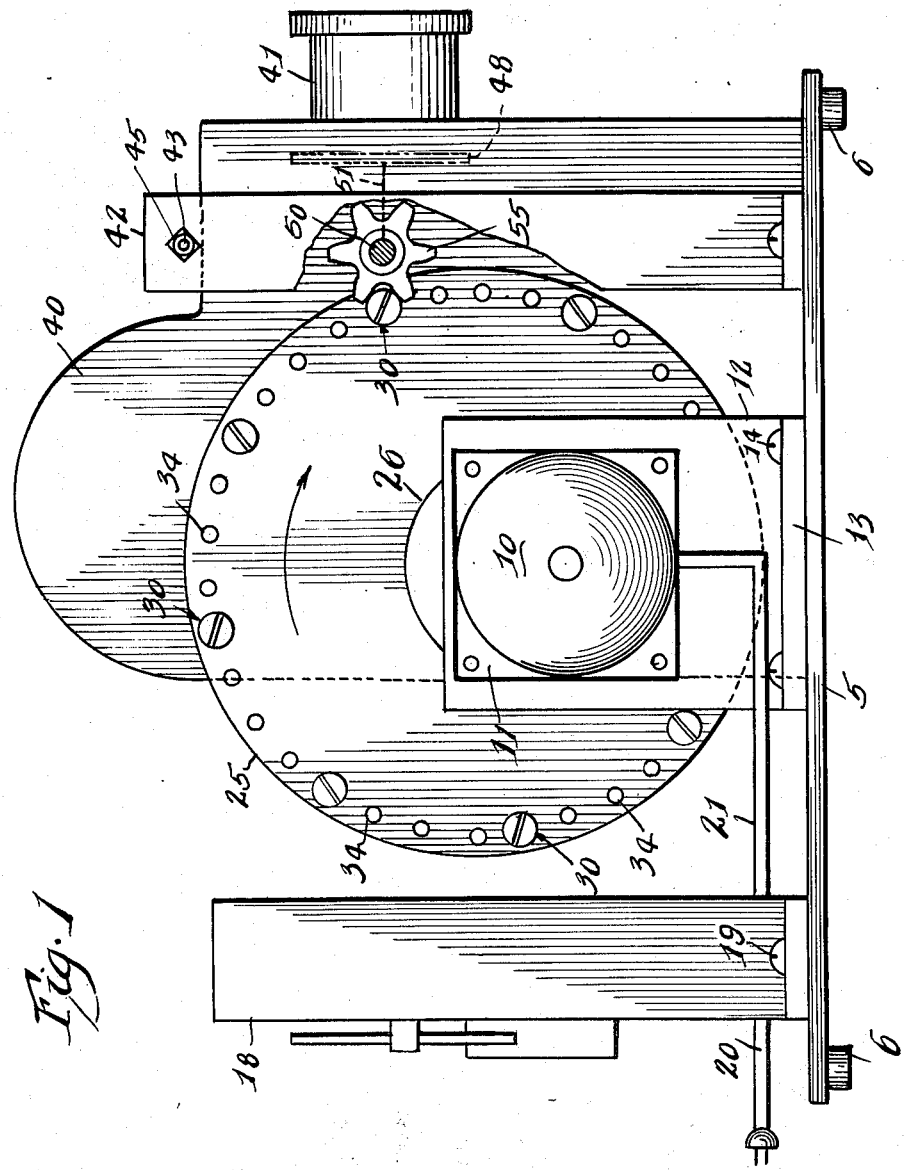
FIG. 1 is a side elevational view, somewhat simplified and partly broken away, of photographic research apparatus embodying the invention.

Referring to the drawings, the illustrated photographic research apparatus embodying the invention includes a base 5 having feet 6 adapted to rest on a suitable supporting surface.

An electric motor 10 is suitably mounted on base 5. In the form of the invention shown, motor 10 is associated with a speed reducer gear train unit 11 (FIG. 2), the latter being mounted on a bracket 12 having a foot 13 secured to base 5 by bolts 14.

A drive shaft 15 (FIG. 2) extends laterally from gear train unit 11. As will be seen, gear train unit 11 is selected or "set" in relation to the speed of motor 10 so that the speed of drive shaft 15 is as desired for a given picture-taking situation.

A time switch 18 is mounted on base 5, as by bolt 19. A power cord 20 (FIG. 1) extends from time switch 18, and the latter is connected by conductor 21 to motor 10.

Time switch 18 is conventional. It can be set, for example, to energize motor 10 only during the daily period of from 8:00 to 9:00 p.m. Switch 18 may, if desired, have a skip mechanism whereby the motor is energized during this period only every other day, or Sunday only.

A driving member 25 is mounted on and rotated by drive shaft 15. In the form of the invention shown, driving member 25 comprises a disk having a hub 26. The latter is secured to drive shaft 15 by means of a set screw 27 (FIG. 2).

At least one tripping unit 30, shown in detail in FIG. 3, is mounted eccentrically on driving member 25. Tripping unit 30 comprises a stud 31 and a rotatable sleeve 32 on stud 31. As shown in FIG. 3, stud 31 may be a headed bolt having a reduced threaded end 33 which is detachably received in threaded opening 34 in driving member 25. The geometry of tripping unit 30 is such that sleeve 32 is freely rotatable on stud 31. The function of tripping unit 30 will be described later.

As best shown in FIG. 1, driving member 25, in the illustrated form of the invention, has a plurality of spaced openings 34 with tripping units 30 mounted in one or more of them. Openings 34 in member 25 are located on a circle which is concentric with the axis of rotation of the member. It will be seen later that tripping units 30 may be added to or subtracted from driving member 25 in order to vary the picture-taking frequency of the apparatus.

As will be seen, tripping units 30 actuate a camera shutter at a speed proportional to the curvilinear speed of the units. Thus, for a given rotational speed of drive shaft 15, shutter speed may be varied in different models of the apparatus by varying the diameter of the circle on driving member 25 on which the tripping units are located.

A motion picture-type camera 40 is suitably mounted on base 5, camera 40 having a forwardly projecting lens barrel 41. An upstanding bracket 42, spaced laterally of the front portion of camera 40, also is mounted on base 5. A brace rod 43, secured at one end to camera 40 at 44, extends through bracket 42. The free end of rod 43 is threaded to receive one or more nuts 45 which are adjustable for a purpose to be described later.

Camera 40 has a shutter 48 which is illustrated more or less diagrammatically in FIG. 2. Shutter 48 preferably is of the rotary type which covers and uncovers an exposure aperture 49. Iris means (not shown) may be provided to vary the size of the exposure aperture. Camera 40 also has a rotatable socket member 50 which through suitable internal connection 51 is adapted to move or rotate shutter 48 at a speed proportionate to the rotational speed of member 50. A conventional film advancing mechanism (not shown) also is driven by rotatable socket member 50.

A rotatable transmission shaft 53 has an end 54 received within socket member 50. As will be seen, shaft 53 drives socket member 50, and the latter actuates shutter 48 as well as the film advancing mechanism.

A sprocket 55 is secured to transmission shaft 53 by means such as set screw 56. The characteristics of sprocket 55, such as pitch diameter, number of teeth, etc., are selected in view of the overall specifications of a particular apparatus.

As shown in FIG. 2, the free end of transmission shaft 53 extends through upstanding bracket 42. One or more washers 57 are positioned on shaft 53 between bracket 42 and sprocket 55. One of the washers 57 preferably is oil-impregnated for lubrication purposes. Nut 45 is adjusted so that bracket 42 will apply a degree of bearing pressure on washer 57 in order to minimize lost motion in the mechanism and avoid backlash.

As best shown in FIG. 1, sprocket 55 is located in effective relation with driving member 25 and in particular with a tripping unit 30 whereby the latter may move into engagement with sprocket 55. Thus, tripping unit 30 is effective to rotate sprocket 55 through the angular distance dictated by the geometry of sprocket 55. Rotation of sprocket 55 and transmission shaft 53 through this angular distance is effective, in camera 40, to produce one picture-taking movement of shutter 48 and to transport the film from one frame to the next.

The structure of tripping unit 30 is such that sprocket 55 is rotated positively and silently by the tripping unit. Sleeve 32 of tripping unit 30 has no appreciable sliding movement with respect to sprocket 55. Rather, sleeve 32 rotates on stud 31, this rotation occurring silently and smoothly.

As previously mentioned, for a given rotational speed of driving member 25, picture-taking frequency is varied by changing the number of tripping units 30 on driving member 25. Thus, if driving member 25 rotates at an angular rate of one revolution per minute, one tripping unit will produce one picture per minute. With two tripping units, usually spaced uniformly, there will be two pictures per minute, etc.

Under conditions of low ambient light level it is necessary for shutter 48 to operate at comparatively slow speed. Slow-speed shutter action readily is provided in the present apparatus by reducing the rotational speed of driving member 25. This is accomplished by varying the speed of motor 10 or altering the speed reduction ratio in gear train unit 11, it being remembered that the speed of shutter movement is proportionate to the curvilinear speed of a tripping unit 30.

When the speed of driving member 25 is changed to vary shutter speed, a harmonizing change in picture-taking frequency easily is made by adding or subtracting tripping units.

From the above description it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. An apparatus for periodic photography comprising: a base, an electric motor mounted upon the base, a speed reduction gear unit driven by said motor and having an output drive shaft extending therefrom, a time switch device adapted to be periodically energized, a disk mounted on and rotated by said drive shaft, said disk having a plurality of circumferentially spaced openings thereabout, a stud adapted to be inserted in any one of said openings and to extend laterally from one side of said disk, a motion picture film type camera mounted upon said base adjacent to said disk, a bracket extending upwardly from said base beside said disk, said camera having an exposure aperture, a rotary-type shutter and a rotatable drive socket adapted to move the camera mechanism, a transmission shaft carried for rotation on said bracket and having one end adapted to be connected to said camera mechanism to drive the camera, a sprocket secured to the opposite end of said shaft, said disk stud being engageable with said sprocket upon one rotation of said disk to turn the sprocket whereby the motion picture camera will be actuated periodically according to the setting of the time switch device.

2. An apparatus for periodic photography as defined in claim 1, and a rotatable sleeve on said stud and said sleeve adapted to engage and rotate said sprocket and rotatable on said stud so as to be free of sliding movement with respect to said sprocket.

3. An apparatus for periodic photography as defined in claim 1, washers positioned on the transmission shaft between the bracket and the sprocket and one of the washers being oil impregnated for lubrication purposes and a brace rod extending between the camera and through said bracket, and nuts on said brace rods adjustable against the bracket to apply pressure upon the washers and minimize lost motion of the disk and avoid backlash thereof.

References Cited by the Examiner

UNITED STATES PATENTS

| 347,294 | 8/86 | Haskin | 74—436 |
| 1,221,097 | 4/17 | Schweitzer | 74—436 |
| 2,353,154 | 7/44 | Fowler | 352—84 X |
| 2,472,299 | 6/49 | Jerome | 352—169 |
| 2,520,296 | 8/50 | Williams | 95—31 |
| 2,912,896 | 11/59 | Allen et al. | 352—84 |
| 3,011,416 | 12/61 | Hammer | 95—11 |

FOREIGN PATENTS

| 776,104 | 10/34 | France. |
| 185,818 | 6/07 | Germany. |
| 1,039 | 1897 | Great Britain. |

NORTON ANSHER, *Primary Examiner.*

WILLIAM MISIEK, *Examiner.*